(12) United States Patent
Heydinger

(10) Patent No.: US 7,548,345 B2
(45) Date of Patent: Jun. 16, 2009

(54) HIGH RESOLUTION PRINT MODE OFFERING IMPROVED TEXT PRINT QUALITY

(75) Inventor: Scott Michael Heydinger, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 1270 days.

(21) Appl. No.: 10/279,390

(22) Filed: Oct. 24, 2002

(65) Prior Publication Data

US 2004/0080788 A1   Apr. 29, 2004

(51) Int. Cl.
G06K 15/02   (2006.01)
H04N 1/40   (2006.01)
H04N 1/403   (2006.01)
H04N 1/60   (2006.01)
G03F 3/08   (2006.01)

(52) U.S. Cl. .............. 358/2.1; 358/1.2; 358/2.99; 358/1.9; 358/529; 358/3.06; 358/1.11; 358/462

(58) Field of Classification Search .............. None
See application file for complete search history.

(56) References Cited

U.S. PATENT DOCUMENTS

| | | | |
|---|---|---|---|
| 4,515,487 A * | 5/1985 | Minami ................. 358/1.9 |
| 4,668,995 A * | 5/1987 | Chen et al. ............. 382/272 |
| 5,270,728 A * | 12/1993 | Lund et al. ................ 347/5 |
| 5,463,703 A * | 10/1995 | Lin ........................ 382/251 |
| 5,477,335 A * | 12/1995 | Tai ......................... 358/2.1 |
| 5,515,456 A * | 5/1996 | Ballard .................. 382/252 |
| 5,555,006 A | 9/1996 | Cleveland et al. |
| 5,574,832 A * | 11/1996 | Towery et al. ............ 358/1.9 |
| 5,592,592 A * | 1/1997 | Shu ......................... 358/1.9 |
| 5,594,839 A * | 1/1997 | Shu ......................... 358/1.9 |
| 5,600,351 A | 2/1997 | Holstun et al. |
| 5,600,353 A * | 2/1997 | Hickman et al. .......... 347/43 |
| 5,719,601 A | 2/1998 | Moore et al. |
| 5,809,215 A * | 9/1998 | Heydinger et al. ........ 358/1.9 |
| 5,920,653 A | 7/1999 | Silverstein |
| 5,982,508 A * | 11/1999 | Kashihara ............... 358/3.08 |
| 6,142,605 A | 11/2000 | Serra et al. |
| 6,158,836 A | 12/2000 | Iwasaki et al. |
| 6,286,926 B1 | 9/2001 | Hirabayashi et al. |
| 6,290,330 B1 * | 9/2001 | Torpey et al. ............. 347/43 |
| 6,296,343 B1 | 10/2001 | Alfaro |
| 6,299,284 B1 | 10/2001 | Alfaro |
| 6,367,908 B1 * | 4/2002 | Serra et al. ................ 347/37 |
| 6,753,976 B1 * | 6/2004 | Torpey et al. ............. 358/1.9 |
| 2001/0015734 A1 | 8/2001 | Kanda et al. |
| 2002/0001098 A1 | 1/2002 | Moriyama et al. |
| 2002/0024558 A1 | 2/2002 | Fujita et al. |
| 2002/0067510 A1* | 6/2002 | Kempf .................... 358/3.03 |

* cited by examiner

Primary Examiner—Twyler L Haskins
Assistant Examiner—Myles D Robinson
(74) Attorney, Agent, or Firm—Taylor & Aust, PC

(57) ABSTRACT

A high-resolution printing method includes the steps of determining if a pixel of a plurality of pixels is a true black pixel and positioning the true black pixel in a predetermined column and a predetermined row of a print matrix.

23 Claims, 6 Drawing Sheets

HIGH RESOLUTION PRINT MODE OFFERING IMPROVED TEXT PRINT QUALITY

BACKGROUND OF THE INVENTION

1. Field of the Invention

The present invention relates to a method and apparatus for implementing high-resolution print modes, and, more particularly, to a method and apparatus for improving text print quality of an imaging device in high-resolution print mode.

2. Description of the Related Art

Techniques for obtaining high resolution printing are used to take print data that is available at one resolution and translate that data to another resolution. The translating process from one resolution to another resolution is known as scaling. Once an image is scaled a technique is used to determine the intensity of the printing medium and the positioning of the printing medium. Such a technique is generally known as a half-toning technique. For example, if the printing medium is ink, the intensity of the ink dot and the placement of the ink dot is determined by the half-toning technique.

Half-toning techniques or algorithms include error diffusion algorithms and ordered dither techniques, which represent techniques for breaking a continuous tone image into a dot structure suitable for printing ink on paper. Error diffusion produces a very finely dispersed dot structure, which is particularly well suited for use in ink jet printers. One of the early error diffusion algorithms was invented by Floyd N. Steinberg in 1975 and is still considered a valuable contribution to the art. However many error diffusion algorithms produce visually noticeable artifacts as a result of the dot placement choices inherent in half-toning algorithms.

Some of the problems of error diffusion algorithms are that they contain a number of inherent drawbacks; for example, patches of regular structure may appear close to certain intensity levels. Such patches are visually disturbing, but also the uneven transition between a structured and unstructured area are clearly visible and undesirable. Some question whether error diffusion algorithms can even be used for certain printing purposes. Some methods used to overcome drawbacks of error diffusion techniques include using serpentine paths instead of scan lines or using space filling curves as the path for processing the intensity level of dot placement. Such techniques have a tendency to improve the behavior for dot placement for some intensity levels and worsening it for others.

What is needed in the art is a method for producing high quality text while in a high-resolution print mode.

SUMMARY OF THE INVENTION

The present invention relates to a high-resolution print mode for an ink jet printer offering improved text print quality.

In one form thereof, the present invention is directed to a high-resolution printing method, including the steps of determining if a pixel of a plurality of pixels is a true black pixel and positioning said true black pixel in a predetermined column and a predetermined row of a print matrix.

In another form thereof, the present invention is directed to a high-resolution printing method including the steps of determining if a pixel of a plurality of pixels is a true black pixel and ascertaining whether a print scan includes a predetermined column of a plurality of columns and a predetermined row of a plurality of rows which corresponds to where the true black pixel is to be printed.

In still another form thereof, the present invention is directed to an imaging system, including a computer and an imaging device. The imaging device includes a controller in communicative connection with the computer. The controller is configured to direct an image to a print media, the image including at least one of graphics and text. The imaging system employs a high-resolution printing method to print the image, wherein the high-resolution printing method includes the steps of determining if a pixel of a plurality of pixels is a true black pixel and ascertaining whether a print scan includes a predetermined column of a plurality of columns and a predetermined row of a plurality of rows which corresponds to where the true black pixel is to be printed.

An advantage of the present invention is that it may be easily implemented in a printer software algorithm.

Another advantage of the present invention is that the method may reduce the number of scans required to print a page on the ink jet printer.

Another advantage is that the present invention can be implemented with present imaging devices through a software/firmware update.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
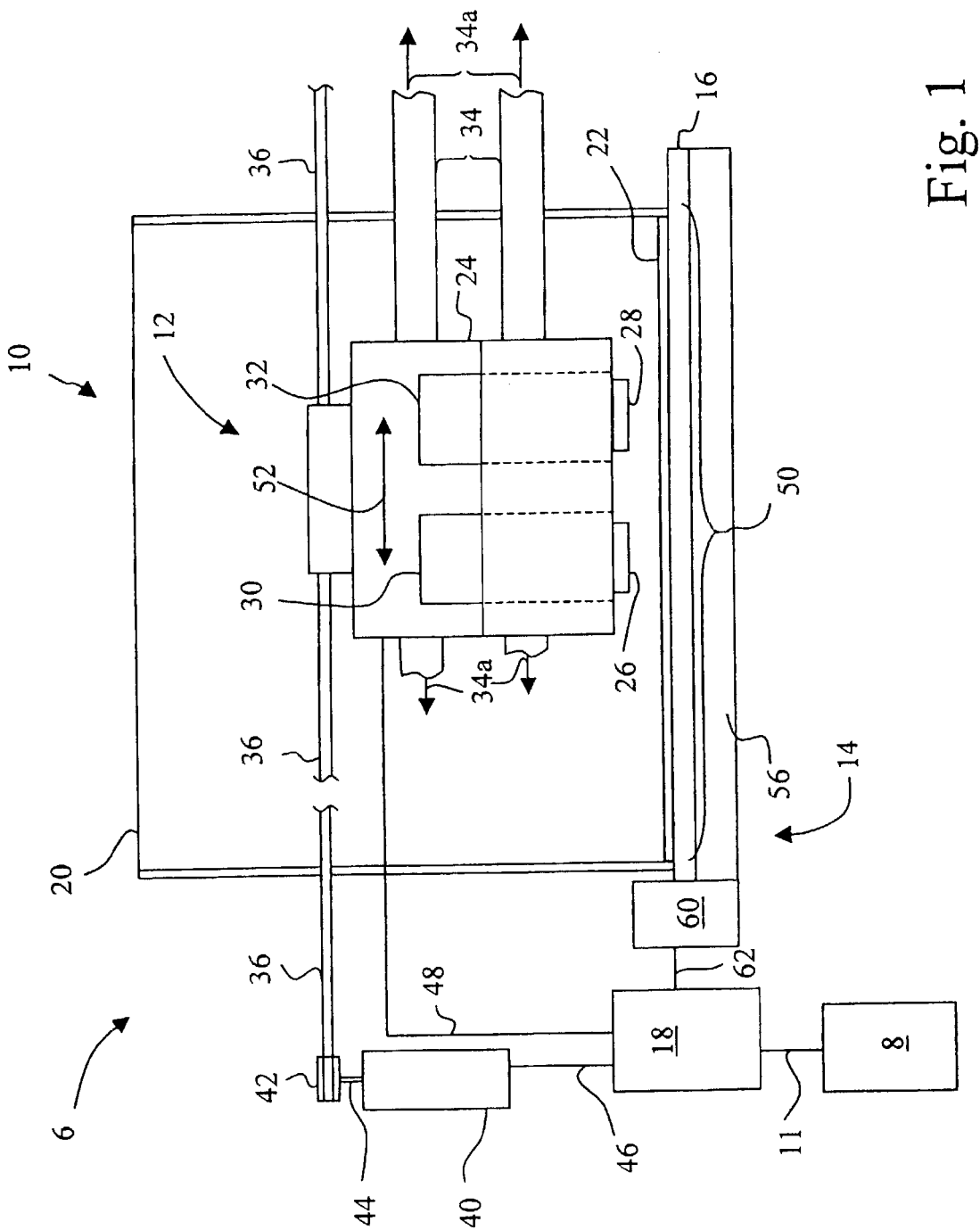
FIG. 1 is a diagrammatic representation of an imaging system employing an embodiment of the method of the present invention.

Referring now to the drawings and more particularly to FIG. 1, there is shown an imaging system 6 embodying the present invention. Imaging system 6 includes computer 8 and an imaging device in the form of an ink jet printer 10. Computer 8 is communicatively coupled to ink jet printer 10 by way of communications link 11. Communications link 11 may be, for example, an electrical, an optical or a network connection.

Computer 8 is typical of that known in the art, and includes a display, an input device such as a keyboard, a processor and associated memory. Resident in the memory of computer 8 is printer driver software. The printer driver software places print data and print commands in a format that can be recognized by ink jet printer 10. The format can be, for example, a data packet including print data and printing commands for a given area such as a print scan and includes a print header that identifies the scan data.

Ink jet printer 10 includes a printhead carrier system 12, a feed roller unit 14, a mid-frame 16, a controller 18, and a media source 20.

Media source 20 is configured and arranged to supply individual sheets of print media to feed roller unit 14, which in turn further transports the sheets of print media 22 during a printing operation.

Printhead carrier system 12 includes a printhead carrier 24 for carrying a color printhead 26 and black printhead 28. A color ink reservoir 30 is provided in fluid communication with color printhead 26 and a black ink reservoir 32 is provided in fluid communication with black printhead 28. Printhead carrier system 12 and printheads 26 and 28 may be configured for unidirectional printing or bidirectional printing.

Printhead carrier 24 is guided by a pair of guide rods 34. The axes 34a of guide rods 34 define a bidirectional-scanning path of printhead carrier 24. Printhead carrier 24 is connected to a carrier transport belt 36 that is driven by a carrier motor 40 by way of driven pulley 42. Carrier motor 40 has a rotating carrier motor shaft 44 that is attached to carrier pulley 42. Carrier motor 40 is electrically connected to controller 18 via communications link 46. At a directive of controller 18, printhead carrier 24 is transported, in a reciprocating manner, along guide rods 34. Carrier motor 40 can be, for example, a direct current motor or a stepper motor.

The reciprocation of printhead carrier 24 transports ink jet printheads 26 and 28 across the sheet of print media 22 along a bidirectional scanning path 34a to define a print zone 50 of printer 10. This reciprocation occurs in a scan direction 52 that is parallel with bidirectional scanning path 34a and is also commonly referred to as the horizontal direction. Printheads 26 and 28 are electrically connected to controller 18 via communications link 48.

During each scan of printhead carrier 24, the sheet of print media 22 is held stationary by feed roller unit 14. Feed roller unit 14 includes a feed roller 56 and a drive unit 60.

During printing, a sheet of print media 22 is transported through print zone 50 by feed roller 56 of feed roller unit 14. A rotation of feed roller 56 is effected by drive unit 60. Drive unit 60 is electrically connected to controller 18 via communications link 62.

When ink jet printer 10 is used in a high-resolution print mode, as commanded by either computer 8 or as controlled by controller 18, a half-toning technique along with the present invention is used to place each ink jet pixel or dot on a particular grid placement. For purposes of discussion it is assumed that standard print mode is a 600×600 dpi (dots per inch) print mode and that a high-resolution print mode is 1200×1200 dpi. When in a high-resolution print mode of 1200×1200 dpi each dot that originally existed in a 600×600 dpi print mode is translated to one or more of four positions in the high-resolution print mode. The present invention places true black pixels at a predefined one of the four locations as the pixel is mapped from the 600×600 dpi print mode to the 1200×1200 dpi print resolution. Each pixel in the 600 dpi print mode has a color value that reflects a numeric value of 0 to 255 for each of the ink colors: cyan, magenta, yellow and black. For example, the color black, or true black as referred to herein, is represented by 0, 0, 0, 255 with each number corresponding to an intensity of each of the ink colors. Various colors are likewise represented by variations in the numeric value for each of the color portions.

In a high-resolution print mode, printers typically use more scans of the printhead than a lower resolution mode and thus require some depletion of the number of dots with respect to the resolution grid in order to avoid over saturating a printed page with ink.

The method of the invention includes the determination of whether a first printing technique, for printing high-resolution graphics or a second printing technique used for printing text, is selected based solely on the existing image data supplied to ink jet printer 10 or to a print driver in computer 8. A color table converts image information from a variety of sources into CMYK data, which is used to print a document using cyan, magenta, yellow and black inks. The output of the color table is a value in the range 0 to 255 for each of the four CMYK colors, corresponding to each pixel. The half-toning algorithm uses the relative values associated with each of the four colors to decide whether a dot is to be printed. The values are translated into a probability of printing a dot. A zero value indicates that no dot should be printed whereas a value of 255 means print a dot with a maximum allowed probability according to the present print mode. For example, in a 600 dpi print mode the value 255 means to absolutely print a dot. However, in a 1200 dpi print mode the value 255 indicates print a dot with a twenty-five percent probability at any of the four positions that are available. The four positions that are available correspond to the fact that there are four positions in a 1200 dpi mode versus a 600 dpi mode. These various interpretations of the same 255 value for the two different resolutions cause the same amount of ink to be printed, on average, per square inch on the paper since one hundred percent of a 600 dpi mode is the same as twenty-five percent of a 1200 dpi mode. The color true black is assumed to represent text and is stored in the color table as the value 0, 0, 0, 255 representing cyan=0, magenta=0, yellow=0 and black=255. All other colors are represented by numbers other than 0, 0, 0, 255.

The error diffusion algorithm receives the numbers from the color table and decides on a pixel-by-pixel basis, whether or not a dot of each of cyan, magenta, yellow and/or black inks are to be placed at each pixel position, according to the probabilities represented by the image data expressed in the range 0 to 255. In contrast to current error diffusion techniques the present invention places a true black dot pixel at a predetermined row and column rather than having the pixel placed based on a probability or other technique of an error diffusion algorithm.

Figure 2:
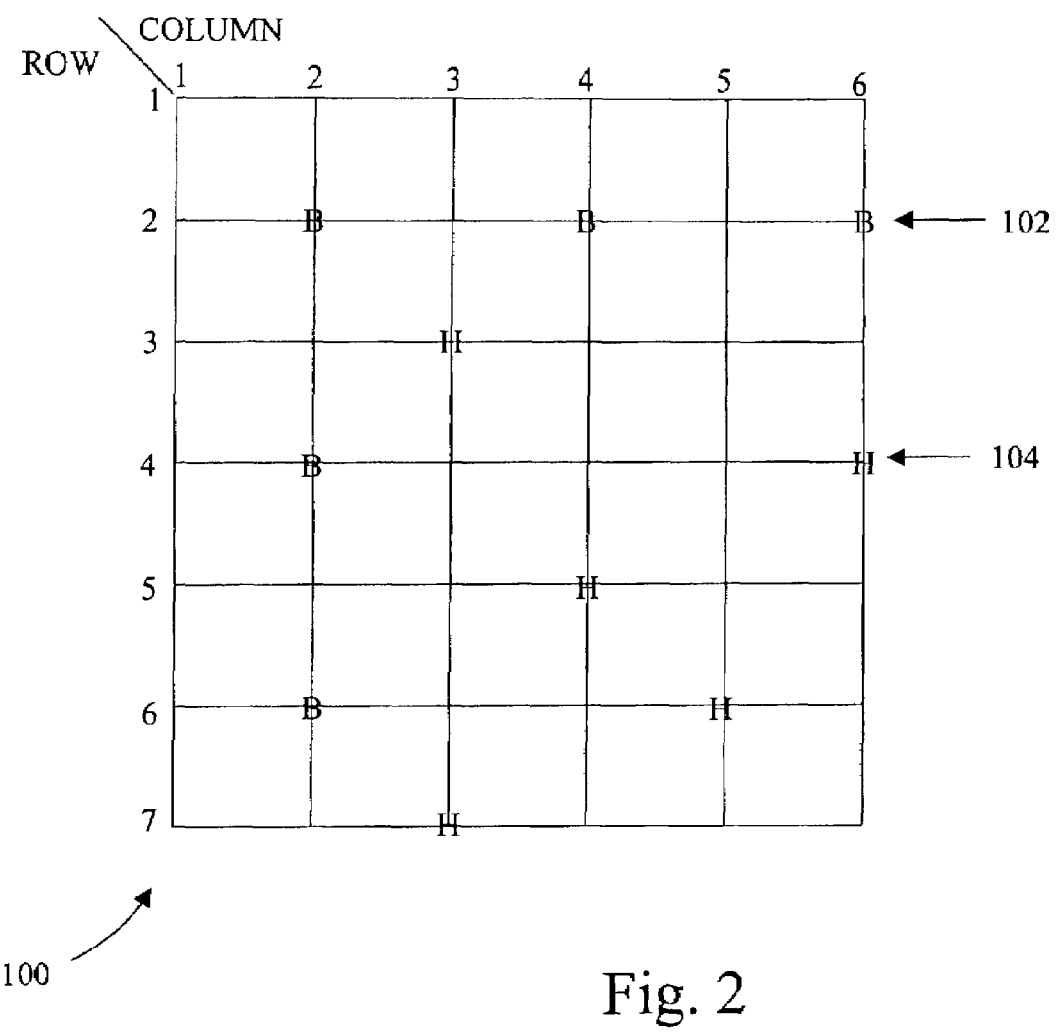
FIG. 2 is a schematic representation of dot placement on a matrix illustrating the method of the imaging system of FIG. 1.

Now, additionally referring to FIG. 2 there is shown a matrix having six columns and seven rows. Based on a convention, used by one embodiment of the present invention, of assigning true black pixels to only even numbered rows and even numbered columns it can be noted, in FIG. 2, the letter B, representative of true black, is located only on even rows and even column numbers. Whereas the assignment of black pixels 102 are represented by the letter B on the grid pattern, half-tone placement of pixels 104 are represented by the letter H. The letter H represents any other color of ink except true black. Whereas true black is identified as having a CMYK value of 0, 0, 0, 255, any other value of CMYK is positioned on the matrix in accordance with a half-toning algorithm. Thus the placement of ink, as represented by the letter H, can include a black component (a K value) as long as the CMYK value differs from 0, 0, 0, 255 in any manner. When transforming a 600 dpi resolution into a 1200 dpi resolution image each pixel can be thought of as having four possible positions in a matrix. For example, each pixel of a 600 dpi image can be placed at any one or more of the positions (1, 1); (1, 2); (2, 1);

or (2, 2) as shown in FIG. 2 and likewise for any similar 2×2 matrix offset from (1, 1) by any multiple of 2 rows or 2 columns.

The H's on grid (matrix) 100 may be assigned, by way of a half-toning algorithm, to any one or more of the four positions that relate to a 1200 dpi print mode whereas true black pixels are biased to positions on predetermined rows and columns, such as even rows and even columns. Whereas printer 10 places ink dots spaced at 1/600 inch intervals, both vertically and horizontally, four scans are utilized to print the pixels positioned by the present invention in high resolution mode. For example, the odd rows and odd columns are printed in one scan, then the odd rows and even columns, then the even rows and odd columns, then lastly the even rows and even columns. By biasing black pixel placement, true black pixels are printed in the same scan of black printhead 28 and are aligned in the same columns thus improving the quality of true black text. Since the true black pixels are all positioned for printing in one scan, the neighboring wet dots inherently bleed together thereby fully filling the interior of the text characters. Whereas wet dots are placed next to dry dots in a multi-scan printing technique, the desirable bleeding effect is diminished.

Figure 3A:
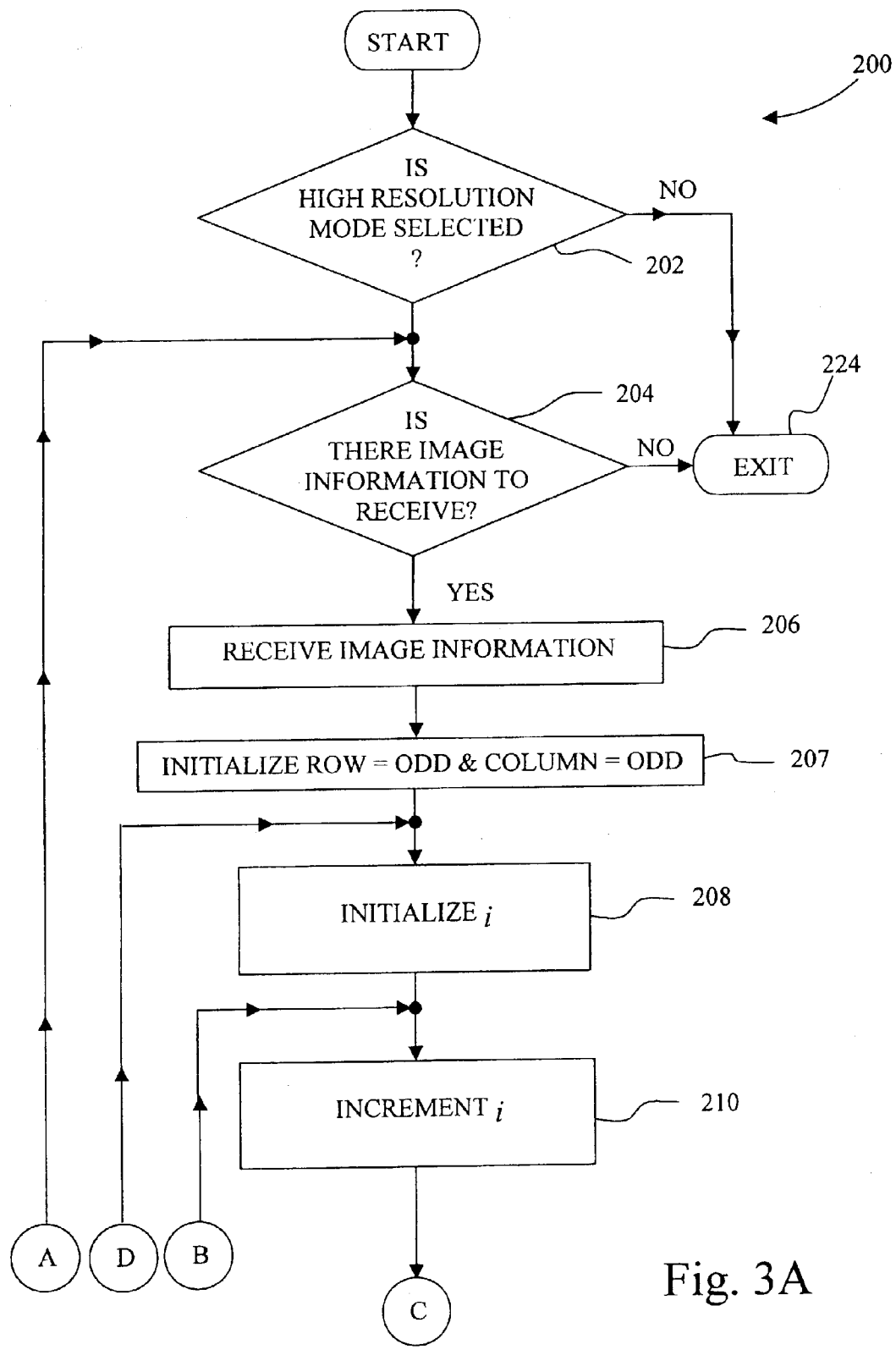
FIGS. 3A, 3B and 3C are a schematic block diagram of one embodiment of the method employed by the ink jet printer of the imaging system of FIGS. 1 and 2.
Figure 3B:
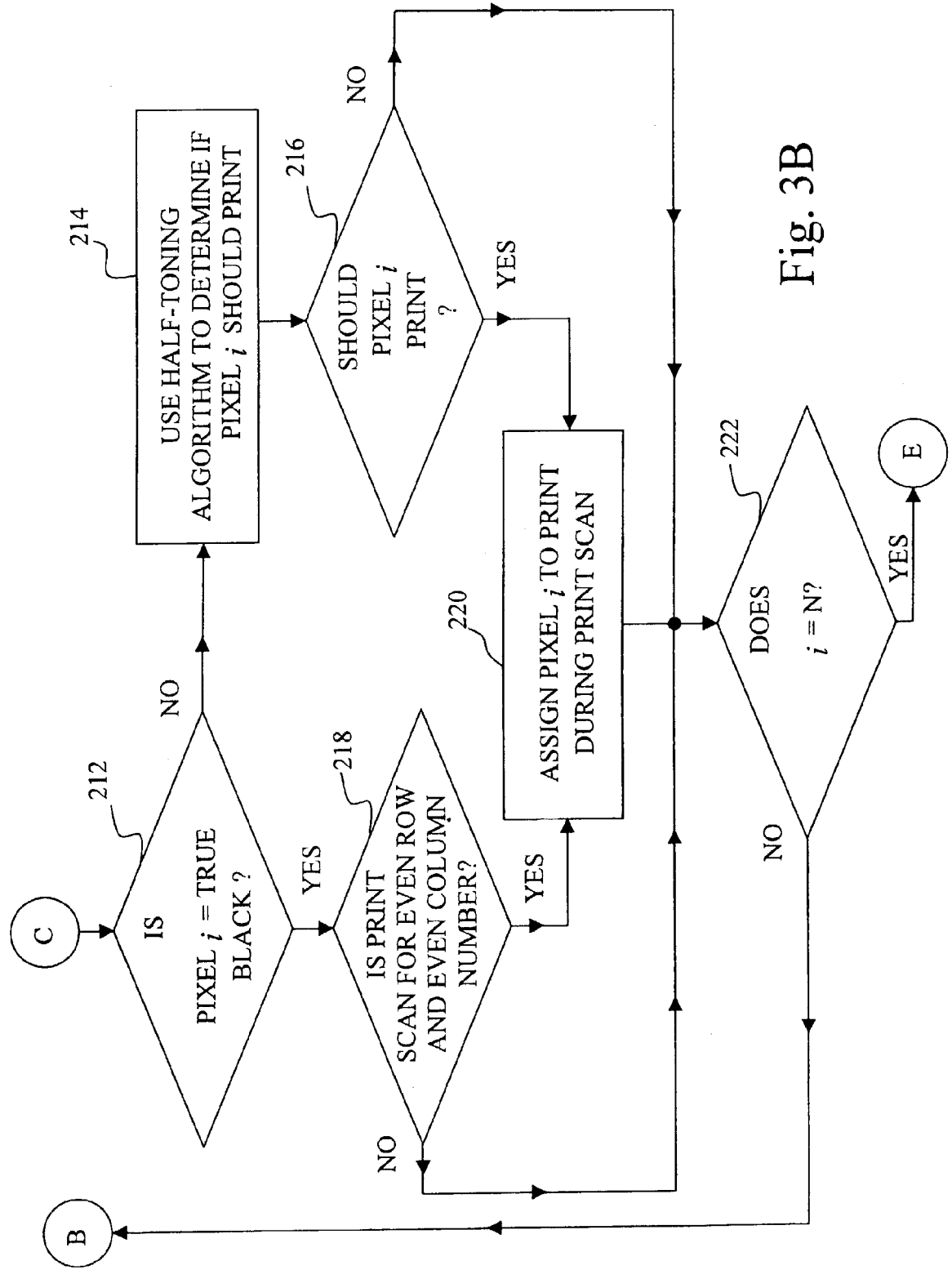
Figure 3C:
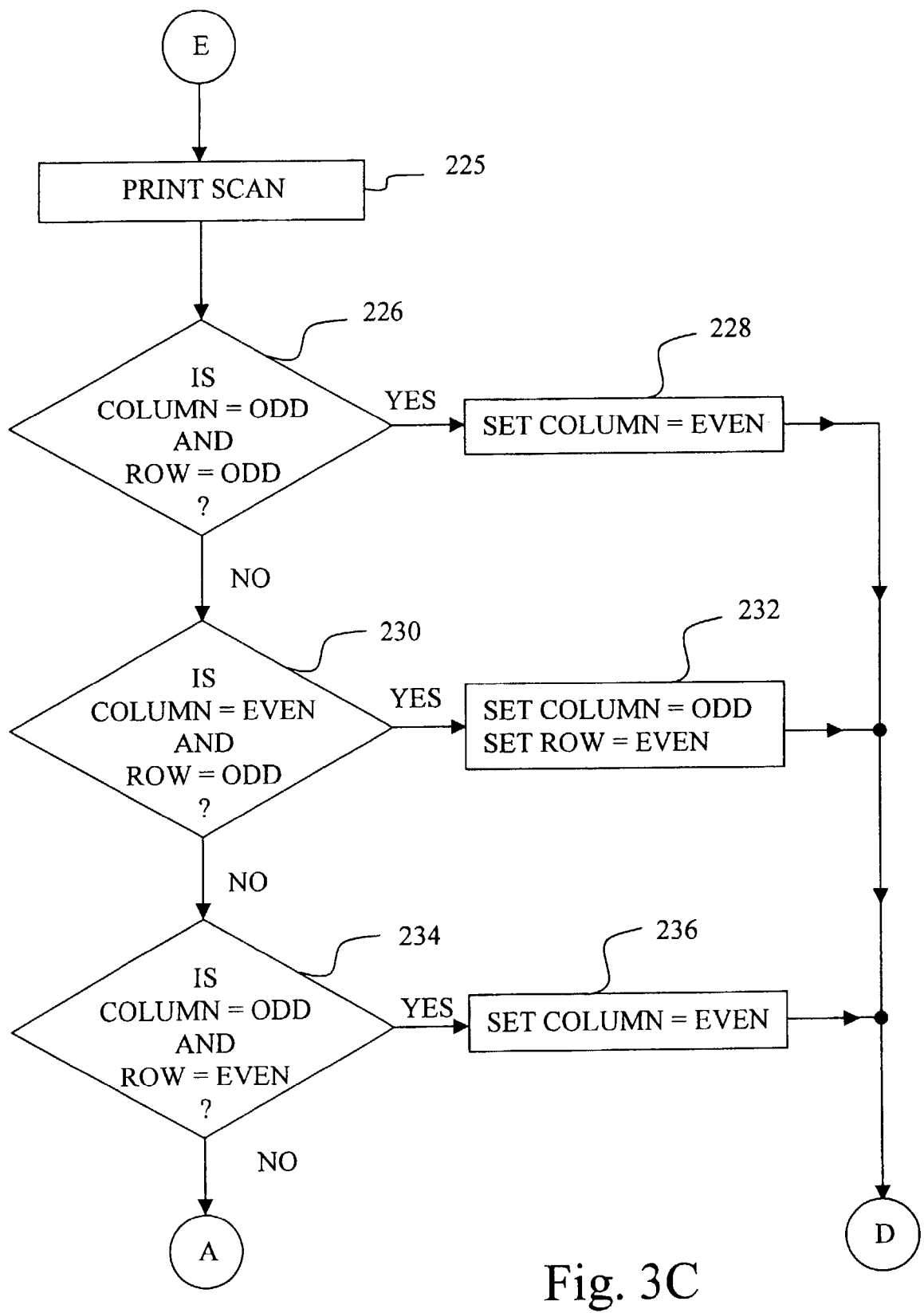

Now, additionally referring to FIGS. 3A, 3B and 3C, there is shown a block diagram representing one of the embodiments of the method of the present invention used to determine which pixels to bias and place in predetermined row and column positions. Block diagram 200 illustrates a process that implements the method of the present invention where there is depicted a plurality of processing steps typically executed by an interaction between controller 18 and image data sent thereto by computer 8. However, it is to be understood that the process can be executed by computer 8 and the result sent to controller 18.

At the point of beginning of process 200, and specifically at step 202, information is received by controller 18, which is tested to see if a high-resolution mode has been selected. A high-resolution print mode may be in the form of twice the resolution of a standard print mode, for example, 1200 dpi may have been selected whereas 600 dpi is a standard resolution of ink jet printer 10. If a high-resolution print mode has not been selected, then process 200 goes to step 224 and exits process 200 and utilizes standard printing techniques. Otherwise the process flow continues to step 204.

At step 204, controller 18 determines if there is image information to be received. If controller 18 has detected that image information is to be received the process continues to step 206. Otherwise, process 200 exits at step 224.

At step 206, controller 18 receives image information from computer 8 and process 200 continues to step 207. At step 207, row and column variables are initialized to 'odd' and process 200 continues to step 208.

At step 208, variable i is initialized. Variable i is a counter that is used in step 222 to compare the value of variable i to a predetermined value N for a control purpose. Predetermined value N corresponds to the number of columns contained in a scan across ink jet printer 10 in normal resolution mode. When ink jet printer 10 is placed in high-resolution mode columns are offset to correspond to the resolution mode that has been selected and usually multiple scans by printhead carrier system 12 are made corresponding to the higher resolution mode. Process flow 200 continues to step 210. At step 210, variable i is incremented, then process 200 continues to step 212.

At step 212, a determination is made as to whether $pixel_i$ is true black. $Pixel_i$ is true black if the color information associated with $pixel_i$ is equal to 0, 0, 0, 255. If $pixel_i$ is true black, then process 200 continues to step 218. Otherwise process 200 continues to step 214.

At step 214, a half-toning algorithm such as an error diffusion technique or an ordered dither is used to determine if pixel should print. It is understood that $pixel_i$ may or may not print in any particular row or column depending upon the application of the half-toning algorithm. Process flow then continues to step 216. At step 216, if pixel is to print process 200 continues to step 220. Otherwise process 200 continues to step 222.

At step 218, it is determined whether the print scan corresponds to an even row and even column. It is understood that the predetermined row and column numbers may or may not be an even row number and column number but rather may be selected based upon the resolution mode actually selected. As illustrated in process 200, if the print scan is for the even row and an even column then process flow continues to step 220. Otherwise, process 200 continues to step 222.

At step 220, pixel is assigned to be printed during a print scan. Process flow then continues to step 222. At step 222, it is determined if variable i is equal to predetermined number N. Predetermined number N, as previously discussed, is the number of columns across ink jet printer 10 that exist in a horizontal direction. If variable i does not equal predetermined number N then process 200 returns to step 210. If variable i does equal predetermined number N then process 200 continues to step 225.

At step 225, a print scan is initiated and the pixels assigned to be printed at step 220 are printed by ink jet printer 10. Process 200 then continues to step 226. At step 226, if the column variable is 'odd' and the row variable is 'odd', process 200 continues to step 228. Otherwise process 200 continues to step 230.

At step 228, the column variable is set to 'even'. Process 200 then returns to step 208.

At step 230, if the column variable is 'even' and the row variable is 'odd', process 200 continues to step 232. Otherwise process 200 continues to step 234.

At step 232, the column variable is set to 'odd' and the row variable is set to 'even'. Process 200 then returns to step 208.

At step 234, if the column variable is 'odd' and the row variable is 'even', process 200 continues to step 236. Otherwise process 200 returns to step 204.

At step 236, the column variable is set to 'even'. Process 200 then returns to step 208.

Figure 4:
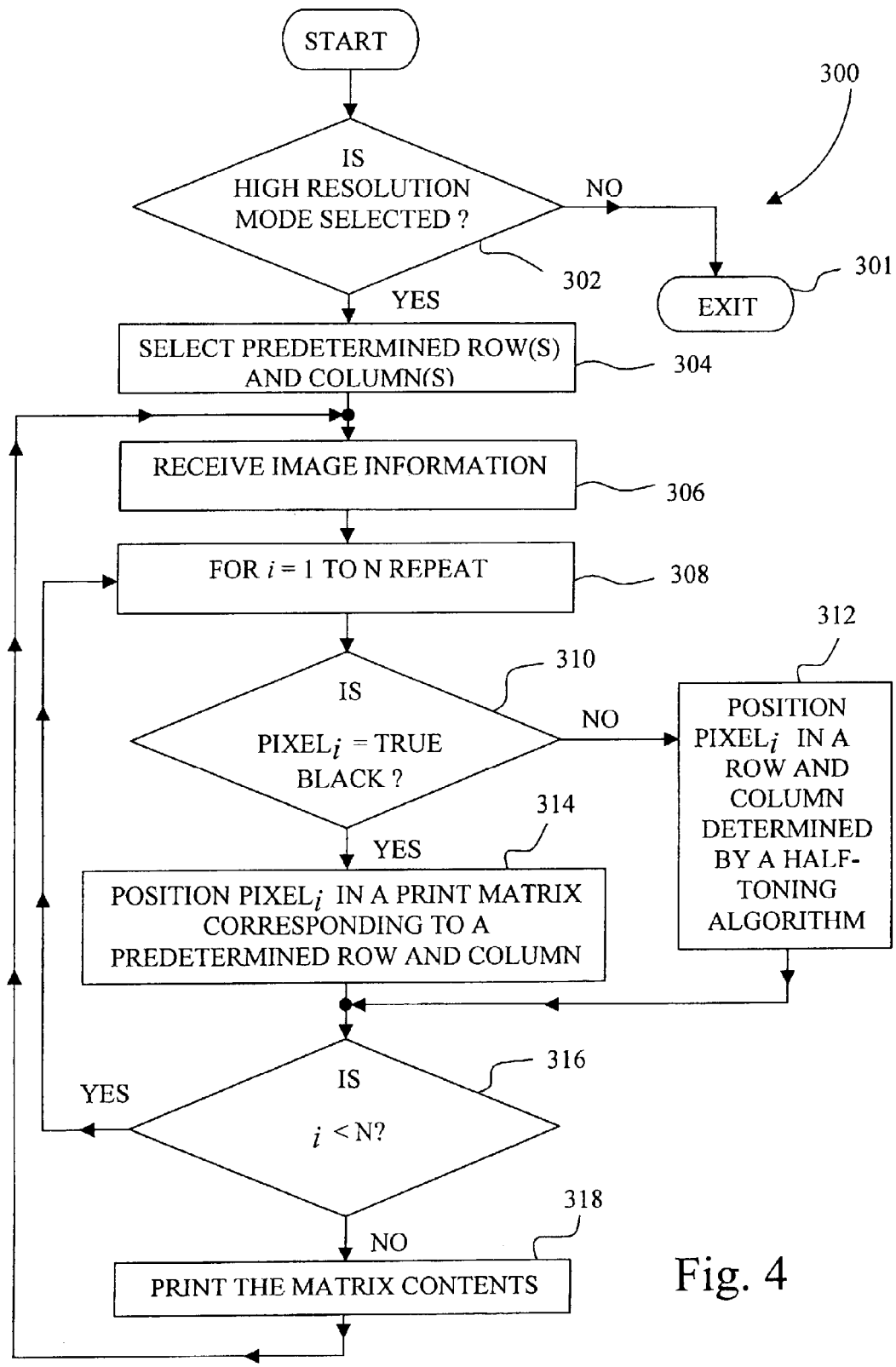
FIG. 4 is a schematic block diagram of another embodiment of the present invention employed by the ink jet printer of the imaging system of FIGS. 1 and 2.

Now, additionally referring to FIG. 4 there is shown a number of processing steps depicting process 300. Process 300 is another embodiment of the present invention, wherein pixels are positioned in a print matrix that is then printed by ink jet printer 10. The print matrix is understood to contain M elements, where M represents the number of pixels in a standard resolution scan multiplied by the ratio of the high-resolution mode dots per square inch to the standard resolution mode dots per square inch.

At the point of beginning process 300 and specifically at step 302, controller 18 determines whether a high-resolution mode has been selected, if no high-resolution mode has been selected process 300 proceeds to step 301 thereby exiting process 300 and utilizing a standard printing technique. If a high-resolution mode has been selected, then process 300 continues to step 304.

At step 304, controller 18 selects predetermined row and column numbers based upon the resolution mode selected. For example, if high-resolution mode is twice the normal resolution then row and column numbers are selected to reflect every other row and every other column number. As a further example, if the high-resolution mode is a different level of resolution multiple rows and columns may be predetermined as selected values. Process 300 then continues to step 306.

At step 306, image information is received by controller 18 from computer 8, and process 300 continues to step 308. At step 308, variable i is initialized to an initial value and it is intended to repeat to N which represents a number of columns in across print zone 50 in a standard resolution mode. Process 300 then continues to step 310.

At step 310, it is determined whether $pixel_i$ is true black, true black is determined, as previously discussed, when color information for $pixel_i$ is equal to 0, 0, 0, 255. If $pixel_i$ has been determined to be true black, process 300 then continues to step 314. Otherwise process 300 continues to step 312.

At step 312, $pixel_i$ is positioned in a row and column of the print matrix as determined by a half-toning algorithm. It should be noted that the row and column is determined by the resolution mode that has been selected as well as the value of variable i. Once pixelhas been positioned, in the print matrix, process 300 continues to step 316. It should be noted that the half-toning algorithm may position $pixel_i$ in more than one row/column combination or not at all depending on the algorithm and the color values of $pixel_i$.

At step 314, since pixels has been determined to be true black, $pixel_i$ is positioned in a predetermined row and column in the print matrix. The predetermined row and column is assigned based on the predetermined rows and columns selected at step 304 and the value of variable i. Variable i is used as an offset within the print matrix so that $pixel_i$ is positioned in a column in the print matrix that corresponds to variable i. Process 300 then continues to step 316

At step 316, it is determined whether variable i is less than predetermined value N. If i is less than predetermined value N then process 300 continues at step 308. Otherwise process 300 continues to step 318.

At step 318, process 300 prints the contents of the print matrix, in multiple scans across print zone 50. Printheads 26 and 28 have multiple nozzles so multiple rows of pixels may be printed in a single scan. While the actual row numbers printed in a scan are dependant on the selected resolution, for the present example either odd rows or even rows of the print matrix are printed in a particular scan. In a similar fashion only odd columns or even columns are printed. Thus in high-resolution print mode four scans are needed to print what would be printed in one scan of a normal resolution mode. For example, if standard resolution is 600×600 dpi and the selected high resolution is 1200×1200 dpi, M=4 and four scans are required to complete the printing in high resolution of the data that would have printed in one scan of standard resolution. The four scans include all of the possible combinations of odd and even rows; and odd and even columns. These being odd rows and odd columns; odd rows and even columns; even rows and odd columns; and even rows and even columns. Process 300 then returns to step 306.

Advantageously, the above discussions describe embodiments of the present invention that print black dots, which correspond to true black pixels, all in even columns and even rows. All black dots that correspond to true black pixels are thethereby printed in the same scan of the printhead. The determination as to which pixels are biased is related to the value of the color data received by controller 18. It should be noted that the black component of the color data can be printed on other scans of the printhead where those black components are printed as part of being in a color at a pixel position that is not a true black pixel but still has a black component.

Also, advantageously the present invention can be seen to possess the attribute of printing some elements of a page, namely true black text, in a single pass print mode and other elements on the same page in a multi-scan print mode. The determination of whether to print some pixels on a single pass verses multiple passes is determined solely by examining the existing image information and does not requiring additional external document structure information, thereby leading to easy implementation.

Even though the present invention is described relative to doubling a standard resolution and thus doubling the number of both rows and columns, the resolution can be varied by factors which differ for the rows and the columns. For example, a 600×600 dpi resolution of pixel data may be transformed to a 2400×1200 dpi mode. One embodiment of the present invention then places true black dots on even rows and every fourth column.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A high-resolution printing method, comprising the steps of:
   setting a print resolution mode;
   selecting a predetermined column and a predetermined row of a print matrix based on said print resolution mode;
   determining if a pixel of a plurality of pixels is a true black pixel;
   positioning said true black pixel in said predetermined column and said predetermined row of said print matrix; and
   printing said pixel.

2. The method of claim 1, the method further comprising the step of positioning said pixel in said print matrix using a half-toning algorithm only where the said pixel is not true black.

3. The method of claim 2, wherein the steps of determining, positioning said true black pixel and positioning said pixel that is not true black are repeated to fill said print matrix, said print matrix containing pixel placement information for a plurality of print scans.

4. The method of claim 3, wherein said printing said pixel further includes printing selected pixels corresponding to a specific row and a specific column of said print matrix during one of said plurality of print scans.

5. The method of claim 4, wherein all of said true black pixels in said print matrix are printed during one of said plurality of scans.

6. The method of claim 1, wherein said predetermined column is one of an even numbered column and an odd numbered column.

7. The method of claim 1, wherein said predetermined row is one of an even numbered row and an odd numbered row.

8. A high-resolution printing method, comprising the steps of:
   setting a print resolution mode;
   selecting a predetermined column of a plurality of columns and a predetermined row of a plurality of rows based on said print resolution mode;
   determining if a pixel of a plurality of pixels is a true black pixel;
   ascertaining whether a print scan includes said predetermined column and said predetermined row which corresponds to where said true black pixel is to be printed; and
   printing said pixel.

9. The method of claim 8, wherein if said pixel is not true black, the method further comprises the step of determining whether said pixel should be printed by using a half-toning algorithm.

10. The method of claim 8, further comprising the step of repeating said determining step and said ascertaining step for each row and column conesponding to said print scan.

11. The method of claim 10, wherein said printing said pixel further includes printing pixels assigned to said print scan.

12. The method of claim 11, wherein each said step is repeated for a plurality of print scans.

13. The method of claim 8, wherein all of said pixels determined to be true black pixels are printed during one scan.

14. The method of claim 8, wherein all of said pixels determined to be true black pixels are printed during one scan that corresponds to one of even numbered columns and odd numbered columns of said plurality of columns.

15. The method of claim 8, wherein all of said pixels determined to be true black pixels are printed during one scan that corresponds to one of even numbered rows and odd numbered rows.

16. An imaging system, comprising:
a computer; and
an imaging device including a controller in communicative connection with said computer, said controller configured to direct an image to a print media, said image including at least one of graphics and text, the imaging system employing a high-resolution printing method to print said image;
wherein said high-resolution printing method includes the steps of:
setting a print resolution mode;
selecting a predetermined column of a plurality of columns and a predetermined row of a plurality of rows based on said print resolution mode;
determining if a pixel of a plurality of pixels is a true black pixel;
ascertaining whether a print scan includes said predetermined column and said predetermined row which conesponds to where said true black pixel is to be printed; and
printing said pixel.

17. The system of claim 16, wherein if said pixel is not true black, said high-resolution printing method further comprises the step of determining whether said pixel should be printed by using a half toning algorithm.

18. The system of claim 16, wherein said high-resolution printing method further comprises the step of repeating said determining step and said ascertaining step for each row and column conesponding to said print scan.

19. The system of claim 18, wherein said wherein said printing said pixel further includes printing pixels assigned to said print scan.

20. The system of claim 19, wherein each step of said high-resolution printing method is repeated for a plurality of print scans.

21. The system of claim 16, wherein all of said pixels determined to be true black pixels are printed during one scan.

22. The system of claim 16, wherein all of said pixels determined to be true black pixels are printed during one scan that corresponds to one of even numbered columns and odd numbered columns of said plurality of columns.

23. The system of claim 16, wherein all of said pixels determined to be true black pixels are printed during one scan that corresponds to one of even numbered rows and odd numbered rows.

* * * * *